(12) United States Patent
Jain et al.

(10) Patent No.: US 6,739,419 B2
(45) Date of Patent: May 25, 2004

(54) VEHICLE ENGINE COOLING SYSTEM WITHOUT A FAN

(75) Inventors: Sunil K. Jain, Fort Wayne, IN (US); Tim P. Nobel, Fort Wayne, IN (US); Scott A. Wooldridge, Fort Wayne, IN (US); David J. Beigel, Kettering, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 29 days.

(21) Appl. No.: 10/132,935

(22) Filed: Apr. 26, 2002

(65) Prior Publication Data

US 2002/0157884 A1 Oct. 31, 2002

Related U.S. Application Data

(60) Provisional application No. 60/287,059, filed on Apr. 27, 2001.

(51) Int. Cl.$^7$ ............................................... B60K 11/08
(52) U.S. Cl. ....................................... 180/68.1; 180/903
(58) Field of Search .............................. 180/68.1, 68.2, 180/68.3, 68.4, 89.18, 89.19, 89.2, 903; 123/41.48, 41.64; 165/41, 44, 51

(56) References Cited

U.S. PATENT DOCUMENTS

| | | | | |
|---|---|---|---|---|
| 3,933,136 A | * | 1/1976 | Burst ....................... 123/41.58 |
| 4,070,070 A | * | 1/1978 | Eggers ..................... 303/116.3 |
| 4,235,298 A | * | 11/1980 | Sackett et al. .............. 180/68.3 |
| 4,523,657 A | * | 6/1985 | Kooyumjian ............... 180/68.1 |
| 4,566,407 A | * | 1/1986 | Peter ........................ 123/41.48 |
| 4,736,727 A | * | 4/1988 | Williams .................... 123/563 |
| 4,938,303 A | * | 7/1990 | Schaal et al. .............. 180/68.1 |
| 5,042,603 A | * | 8/1991 | Olson ........................ 180/68.3 |
| 5,056,601 A | * | 10/1991 | Grimmer ...................... 165/47 |
| 5,143,516 A | * | 9/1992 | Christensen ............. 415/182.1 |
| 5,178,213 A | * | 1/1993 | Watson et al. .............. 165/173 |
| 5,181,554 A | * | 1/1993 | Mita ............................ 165/41 |
| 5,193,608 A | * | 3/1993 | Sekine et al. ................. 165/41 |
| 5,528,900 A | * | 6/1996 | Prasad .......................... 62/175 |
| 5,528,901 A | * | 6/1996 | Willis .......................... 60/626 |
| 5,551,505 A | * | 9/1996 | Freeland ....................... 165/41 |
| 5,588,482 A | * | 12/1996 | Holka .......................... 165/44 |
| 6,202,782 B1 | * | 3/2001 | Hatanaka .................... 180/301 |

* cited by examiner

Primary Examiner—Brian L. Johnson
Assistant Examiner—Bridget Avery
(74) Attorney, Agent, or Firm—Jeffrey P. Calfa; Dennis Kelly Sullivan; Susan L. Lukasik

(57) ABSTRACT

A vehicle cooling system for a mobile vehicle consists of three essential parts. These are a compressed air reservoir, a heat exchanger and a duct connecting the reservoir and the heat exchanger. On demand, the compressed air will be released to the duct and will expand (as the end connected to the reservoir is expected to be lower in cross-sectional area compared to the end connected to the face of the heat exchanger). This expansion will lead to the reduction in air temperature. This helps in increasing the heat rejection capacity of the cooling system. The colder air passes through the heat exchanger and carries away the heat. This air exits from the other end of the heat exchanger into the environment. A fan is optional to operate behind the heat exchanger to help draw the air though it. The compressed air may originate in the vehicle air system for operating air brakes found on medium and heavy-duty trucks or the compressed air may originate from a separate air compressor. The system may be located in various locations on the vehicle due to the lack of reliance on ram air caused from vehicle movement.

7 Claims, 2 Drawing Sheets

VEHICLE ENGINE COOLING SYSTEM WITHOUT A FAN

This is a non-provisional patent application claiming priority of provisional patent application serial No. 60/287,059, filed Apr. 27, 2001.

BACKGROUND

This invention relates to a cooling system for a mobile vehicle that may operate without the use of a fan. Specifically, the fan-less cooling system will provide cooling to engine coolant coils by releasing high-pressure air to expand around the outside of the tubing for engine coolant. The expansion of the pressurized air will chill the air. The air will absorb heat from the engine coolant in the tubing. A fan may be used to accelerate the expansion however no fan is required. The fan-less cooling system does not need to be installed at the front of the mobile vehicle as ram air from vehicle movement will not be necessary to provide driving force for the gas expansion.

PRIOR ART

Vehicles have traditionally drawn cooling air or ram air from a location towards the front of a vehicle. The vehicle's movement along the road provides the force to drive air across cooling coils of the engine or other vehicle heat exchangers such as interior air conditioning or transmission oil coolers. Obviously, vehicle movement was required to achieve cooling without a fan. Fans directly engaged to the vehicle engine provided the force to move air across the cooling coils in low vehicle movement conditions. The need for higher under-hood cooling capacity along with ever decreasing space under the hood space has led the designers to look for remotely locating a part of the under-hood cooling system. An example can be a condenser unit along with a cooling fan used for HVAC system. Typically a cooling system consists of a fan and heat exchangers and thus requires a steady source of quality air. This requirement of air (free of debris etc) along with a rotating fan has limited the remote location to very few places. A vehicle cooling system is needed that does not require to be mounted in a location on a forward end of the vehicle to acquire ram air and does not require a fan and hence this is a primary objective of this invention.

SUMMARY

The cooling system and vehicle of this invention satisfy the primary objective of this invention as follows. The cooling system consists of three essential parts. These are a compressed air reservoir, heat exchanger (for example a condenser) and a duct connecting the reservoir and the heat exchanger. On demand, the compressed air will be released to the duct and will expand (as the end connected to the reservoir is expected to be lower in cross-sectional area compared to the end connected to the face of the heat exchanger). This expansion will lead to the reduction in air temperature. This helps in increasing the heat rejection capacity of the cooling system. The colder air passes through the heat exchanger and carries away the heat. This air exits from the other end of the heat exchanger into the environment. A fan is optional to operate behind the heat exchanger to help draw the air though it. The compressed air may originate in the vehicle air system for operating air brakes found on medium and heavy-duty trucks or the compressed air may originate from a separate air compressor. The system may be located in various locations on the vehicle due to the lack of reliance on ram air caused from vehicle movement.

DRAWINGS

Other objects and advantages of the invention will become more apparent upon perusal of the detailed description thereof and upon inspection of the drawings, in which.

DETAILS OF INVENTION

Figure 1:
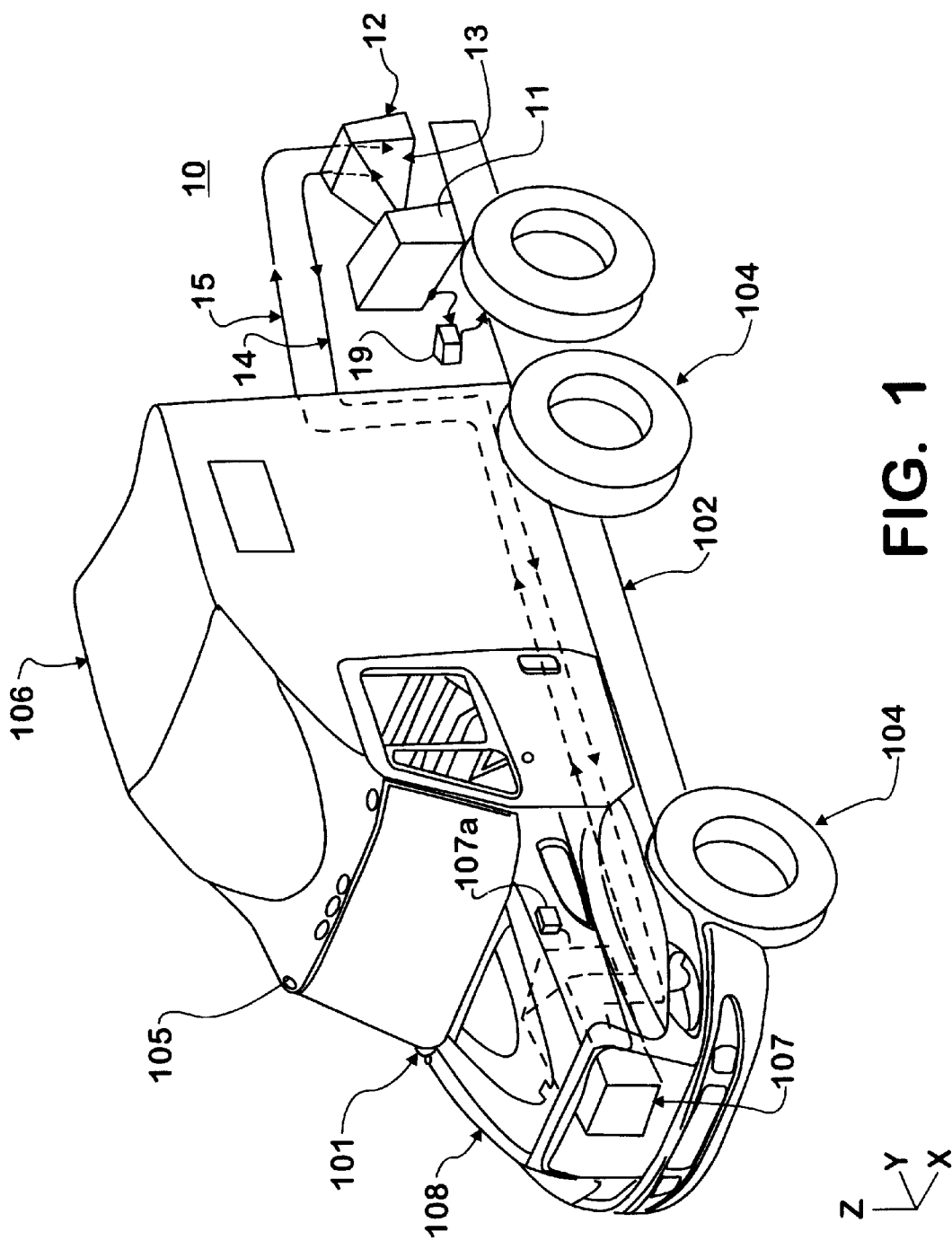
FIG. 1 is a simple one line drawing of a vehicle with a fan-less cooling system for a mobile vehicle installed and made in accordance with this invention.

FIG. 1 shows a vehicle 101 containing a fan-less cooling system 10 made in accordance with this invention. The vehicle 101 has a chassis 102 engaged to axles with wheels 104. There is a driver cab 105 engaged to the chassis 102. Heavy-duty highway vehicle cabs 105 may contain a sleeper compartment 106. There is an engine 107 engaged to the chassis 102 under a hood 108, the engine 107 for providing motive force to the vehicle 101. The engine 107 may have auxiliary systems such as an internal oil system and an engine coolant system. The internal oil system and the engine coolant system of the engine 107 may be cooled by a fan-less cooling system 10 made in accordance with this invention. The fan-less cooling system may be used alone to cool these engine auxiliary systems are in conjunction with a conventional ram air engine cooling arrangement. The cab 105 and sleeper 106, if provided, may have an air conditioning system consisting at a minimum of a fan to disperse air blown across coolant tubing, the coolant in the coolant tubing having been cooled by another heat exchanger.

Figure 2:
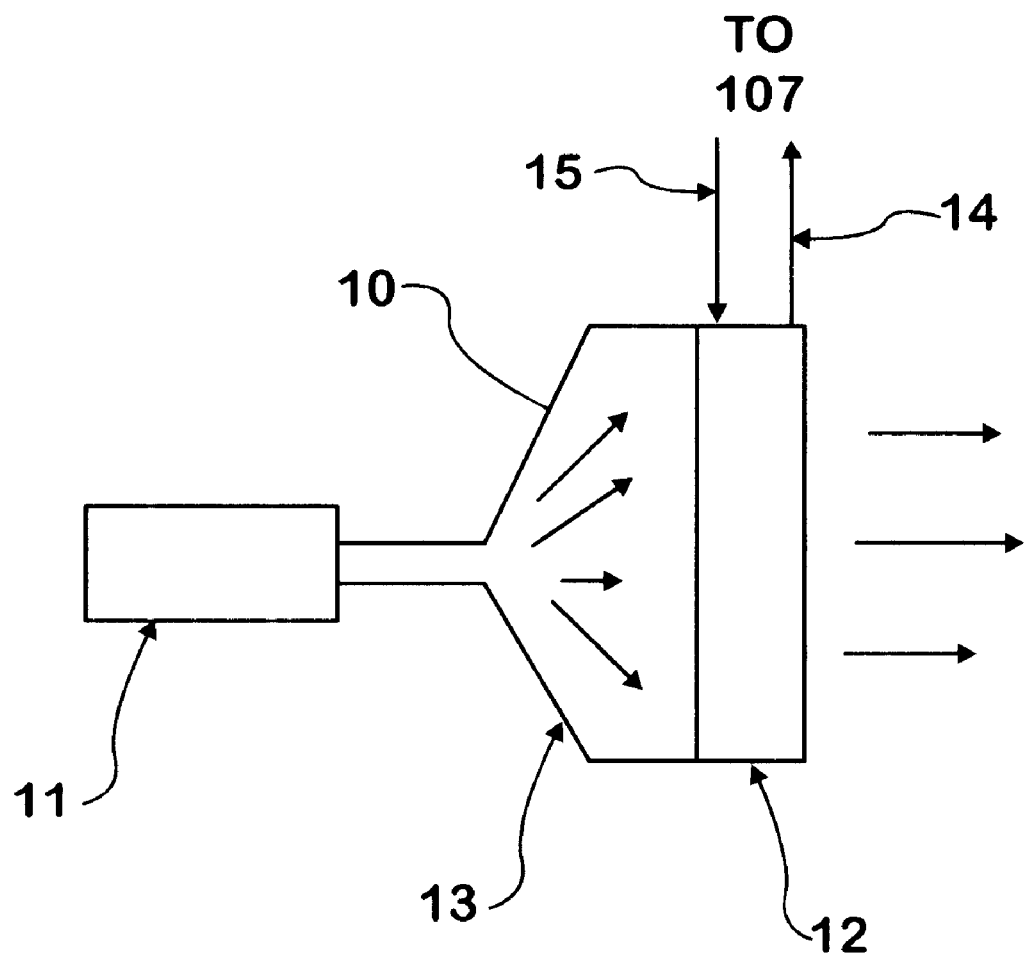
FIG. 2 is a one line drawing of the fan-less cooling system shown in FIG. 1.

The fan-less cooling system 10 better shown in FIG. 2 is shown mounted to the vehicle rearward of the cab 105. The fan-less cooling system 10 may be located in other locations on the vehicle as it does not require surface area near the front of the vehicle 101 to be exposed to ram air. Alternative locations may include various mounting locations along the rails of the chassis 102

The fan-less cooling system 10 consists of three essential parts. These are a compressed air reservoir 11, a heat exchanger or condenser 12 and an expansion duct 13 connecting the reservoir 11 and the heat exchanger 12. On demand, the compressed air may be released to the duct 13 and will expand. In the embodiment shown, the end connected to the reservoir 11 is expected to be lower in cross-sectional area compared to the end connected to the face of the heat exchanger 12. This expansion will lead to the reduction in air temperature due to known gas laws. This helps in increasing the heat rejection capacity of the cooling system 10. The colder air passes through the heat exchanger 12 and carries away the heat. This air exits from the other end of the heat exchanger into the environment. There is supply coolant piping 14 from the heat exchanger 12 to the engine 107 and return coolant piping 15 from the engine 107 to the heat exchanger 12.

The duct 13 may be flared outward from the air reservoir 11 toward the heat exchanger to facilitate and channel the air expansion and hence the cooling effect.

The reservoir 11 release of air may be controlled by an engine electronic controller 107a that among other functions may monitor engine 107 performance or temperatures. Upon sensing a performance or parameter change indicating the need for supplemental cooling for either the engine oil system or the engine coolant system, the engine controller 107a may direct the air reservoir 11 to release air to the duct 13 hence providing additional cooling to the engine auxiliary systems.

A fan may be optional to operate behind the heat exchanger 12 to help draw the air though it. The compressed air may originate in the vehicle air system 19 for operating air brakes engaged to the wheels 104 such as that found on medium and heavy-duty trucks or the compressed air may originate from a separate air compressor. Vehicle air brake pressure is generally stored between 120 and 150 psig so there is a considerable amount of potential energy to be released when this compressed air is allowed to expand in the duct 13 and flows across tubes within the heat exchanger 12. The system 10 may be located in various locations on the vehicle 101 due to the lack of reliance on ram air caused from vehicle movement.

In another embodiment, a fan-less cooling system 210 may be used in conjunction with an air conditioning or heating ventilation and air conditioning (HVAC) system 220 for providing cooling to the internal passenger and driver area of a cab 205 of a mobile vehicle 201. This air conditioning system 210 may have parallel cooling trains, one from a conventional ram air heat exchanger and one from the fan-less cooling system 210, or just the fan-less cooling system 210. The fan-less cooling system 210 for air conditioning system 210 of a cab 205 would work as described above and may come in the above described configurations. The fan-less cooling system 210 would consist of three parts. These are the compressed air reservoir 211, the heat exchanger or condenser 212 and the expansion duct 213 connecting the reservoir 211 and the heat exchanger 212. On demand, compressed air may be released to the duct 213 and the air will expand. An air conditioning system electronic controller 221 sensing cab 205 parameters such as heat or humidity or both may control the release of compressed air to the expansion duct 213. There is supply coolant piping 214 from the heat exchanger 212 to the air conditioning system 220 and return coolant piping 215 from the air conditioning system 220 to the heat exchanger 212. The fan-less cooling system 210 is shown behind the cab 205, however it may be located in various locations on the vehicle including but not limited to under the cab 205 or under a hood 206 of the vehicle 201.

As described above, a fan-less cooling system and a vehicle with this system installed provides a number of advantages, some of which have been described above and others of which are inherent in the invention. Also modifications may be proposed to the fan-less cooling system and a vehicle with this system installed with these components installed without departing from the teachings herein.

We claim:

1. A fan-less cooling system in combination with a mobile vehicle, comprising:
   a vehicle chassis engaged to a driver cab;
   axles with wheels suspended to said chassis;
   an engine for driving said axles and wheels engaged to said chassis;
   a compressed air reservoir engaged to said chassis;
   a heat exchanger and an expansion duct connecting said air reservoir to said heat exchanger;
   coolant piping between said heat exchanger and said engine;
   wherein compressed air released from said air reservoir to said duct for expansion across a face of said heat exchanger provides for removal of heat from said cooling piping supplied to said engine;
   an end of said expansion duct connected to said reservoir being of a lower cross-sectional area than an end of said expansion duct connected to said face of said heat exchanger; and
   said expansion duct being flared outward from said air reservoir toward said heat exchanger.

2. The cooling system and vehicle combination of claim 1, wherein:
   said reservoir being an air source to air brakes for said wheels of said chassis.

3. A fan-less cooling system in combination with a mobile vehicle, comprising:
   a vehicle chassis engaged to a driver cab;
   axles with wheels suspended to said chassis;
   an engine for driving said axles and wheels engaged to said chassis;
   a compressed air reservoir engaged to said chassis;
   a heat exchanger and an expansion duct connecting said air reservoir with said heat exchanger;
   coolant piping between said heat exchanger and said engine;
   wherein compressed air released from said air reservoir to said duct for expansion across a face of said heat exchanger provides for removal of heat from said cooling piping supplied to said engine;
   an end of said expansion duct connected to said reservoir being of a lower cross-sectional area than an end of said expansion duct connected to said face of said heat exchanger;
   said expansion duct being flared outward from said air reservoir toward said heat exchanger;
   an engine electronic controller for monitoring engine parameters and said electronic controller engaged to said engine;
   said electronic controller electrically engaged to control releases of compressed air from said reservoir to said expansion duct; and
   said controller programmed that upon sensing a parameter change indicating a need for supplemental cooling for an auxiliary system of said engine performing the step of directing an outlet control of said air reservoir to release air to said expansion duct.

4. A fan-less cooling system for providing cooling to engine auxiliaries of a mobile vehicle, the vehicle having a vehicle chassis engaged to a driver cab, and the chassis having axles with wheels, comprising:
   a compressed air reservoir for engagement to the chassis;
   a heat exchanger and an expansion duct connecting said air reservoir with said heat exchanger;
   coolant piping for engagement between said heat exchanger and the engine;
   wherein compressed air released from said air reservoir to said duct for expansion across a face of said heat exchanger provides far removal of heat from said cooling piping supplied to the engine;
   an end of said expansion duct connected to said reservoir being of a lower cross-sectional area than an end of said expansion duct connected to said face of said heat exchanger; and
   said expansion dud being flared outward from said air reservoir toward said heat exchanger.

5. The cooling system of claim 4, wherein:
   said reservoir being an air source to air brakes for wheels of the chassis.

6. A fan-less cooling system in combination with a mobile vehicle, comprising:
- a vehicle chassis engaged to a driver cab;
- axles with wheels suspended to said chassis;
- an air conditioning system for providing cooling to said cab;
- a compressed air reservoir engaged to said chassis;
- a heat exchanger and an expansion duct connecting said air reservoir with said heat exchanger;
- coolant piping between said heat exchanger and said air conditioning system;
- wherein compressed air released from said air reservoir to said duct for expansion across a face of said heat exchanger provides for removal of heat from said cooling piping supplied to said air conditioning system;
- an end of said expansion duct connected to said reservoir being of a lower cross-sectional area than an end of said expansion duct connected to said face of said heat exchanger; and
- said expansion duct being flared outward from said air reservoir toward said heat exchanger.

7. The cooling system and vehicle combination of claim 6, wherein:
- said reservoir being an air source to air brakes for said wheels of said chassis.

* * * * *